US010235699B2

(12) United States Patent
Bostick et al.

(10) Patent No.: US 10,235,699 B2
(45) Date of Patent: Mar. 19, 2019

(54) AUTOMATED UPDATING OF ON-LINE PRODUCT AND SERVICE REVIEWS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Glendale, CA (US)

(73) Assignee: International Business Machines Corporation, Armonk, NY (US)

(*) Notice: Subject to any disclaimer, the term of this patent is extended or adjusted under 35 U.S.C. 154(b) by 519 days.

(21) Appl. No.: 14/948,853

(22) Filed: Nov. 23, 2015

(65) Prior Publication Data

US 2017/0148071 A1 May 25, 2017

(51) Int. Cl.
*G06Q 30/02* (2012.01)
*G06Q 10/08* (2012.01)
*G06F 17/30* (2006.01)

(52) U.S. Cl.
CPC ... *G06Q 30/0282* (2013.01); *G06F 17/30684* (2013.01); *G06F 17/30705* (2013.01); *G06Q 10/087* (2013.01)

(58) Field of Classification Search
USPC .......................................................... 705/28
See application file for complete search history.

(56) References Cited

U.S. PATENT DOCUMENTS

| 7,065,494 | B1* | 6/2006 | Evans ............. G06Q 10/06393 370/248 |
| 7,519,562 | B1* | 4/2009 | Vander Mey .......... G06Q 30/02 705/12 |
| 7,711,653 | B1* | 5/2010 | Denham ................ G06Q 10/20 705/1.1 |
| 7,720,705 | B2* | 5/2010 | Stein .................. G06Q 30/0203 705/7.32 |
| 7,899,875 | B1* | 3/2011 | Gall ..................... G06Q 30/018 709/206 |
| 8,166,032 | B2  | 4/2012 | Sommer |
| 8,315,895 | B1* | 11/2012 | Kilat .................. G06Q 30/0278 705/7.11 |

(Continued)

OTHER PUBLICATIONS

Wei C, Chen Y, Yang C, Yang C. Understanding what concerns consumers: a semantic approach to product feature extraction from consumer reviews. Information Systems & E-Business Management [serial online]. Mar. 2010;8(2):149-167. Available from: Computers & Applied Sciences Complete, Ipswich, MA.*

(Continued)

*Primary Examiner* — Ashford S Hayles
(74) *Attorney, Agent, or Firm* — George R. McGuire; Bond Schoeneck & King, PLLC; John Pivnichny

(57) ABSTRACT

The present invention provides a computerized system that analyzes the text of on-line product and service reviews, compares the textual components of the review with a database of manufacturer/service producer updates to the product or service to which the review pertains, provides corrective commentary to the review based upon post-review action taken by the manufacture/service provider, and adjusts the weighting of the review on the basis of the outdated information.

20 Claims, 8 Drawing Sheets

(56) References Cited

U.S. PATENT DOCUMENTS

| | | | |
|---|---|---|---|
| 8,504,486 B1* | 8/2013 | Pinto | G06Q 30/0631 705/1.1 |
| 8,595,151 B2 | 11/2013 | Hao | |
| 8,645,295 B1* | 2/2014 | Dillard | G06Q 30/02 705/7.29 |
| 8,862,492 B1* | 10/2014 | Kulshreshtha | G06Q 30/0609 705/7.32 |
| 8,862,577 B2 | 10/2014 | Hao | |
| 9,038,054 B1* | 5/2015 | Kozak | G06Q 30/02 717/170 |
| 9,396,490 B1* | 7/2016 | Marx | G06Q 30/0282 |
| 9,479,516 B2* | 10/2016 | Mote | H04L 63/12 |
| 9,588,760 B1* | 3/2017 | Bostick | G06F 8/71 |
| 9,639,869 B1* | 5/2017 | Franson | G06Q 30/0203 |
| 9,697,490 B1* | 7/2017 | Piper | G06Q 30/0203 |
| 2004/0098287 A1* | 5/2004 | Young | G06Q 10/02 705/5 |
| 2004/0172272 A1* | 9/2004 | Shillinglaw | G06Q 10/06375 705/7.37 |
| 2005/0091038 A1* | 4/2005 | Yi | G06F 17/2715 704/10 |
| 2007/0106644 A1* | 5/2007 | Minerley | G06F 17/30663 |
| 2007/0143122 A1 | 6/2007 | Holloway | |
| 2008/0071602 A1* | 3/2008 | Ojakaar | G06Q 30/02 705/14.44 |
| 2008/0097835 A1* | 4/2008 | Weiser | G06Q 30/02 705/306 |
| 2008/0215349 A1* | 9/2008 | Baran | G06Q 10/10 705/1.1 |
| 2009/0006216 A1* | 1/2009 | Blumenthal | G06F 17/30864 705/26.62 |
| 2009/0063481 A1* | 3/2009 | Faus | G06F 17/2705 |
| 2009/0217208 A1* | 8/2009 | Mushtaq | G06F 17/30864 715/854 |
| 2009/0265307 A1* | 10/2009 | Reisman | G06F 17/30719 |
| 2009/0282019 A1* | 11/2009 | Galitsky | G06F 17/30634 |
| 2010/0023382 A1* | 1/2010 | Fushimi | G06F 17/30702 705/7.29 |
| 2010/0114615 A1* | 5/2010 | Ganguly | G06F 17/3053 705/5 |
| 2010/0121685 A1* | 5/2010 | Mahadevan | G06Q 10/06 705/7.39 |
| 2010/0274791 A1* | 10/2010 | Chow | G06Q 30/02 707/748 |
| 2011/0087737 A1* | 4/2011 | Smith | G06Q 30/02 709/205 |
| 2011/0161071 A1* | 6/2011 | Duong-van | G06F 17/30867 704/9 |
| 2011/0173093 A1* | 7/2011 | Psota | G06Q 30/06 705/26.35 |
| 2011/0191417 A1* | 8/2011 | Rathod | G06Q 30/02 709/204 |
| 2011/0246179 A1* | 10/2011 | O'Neil | G06F 17/2765 704/9 |
| 2011/0252031 A1* | 10/2011 | Blumenthal | G06F 17/30864 707/733 |
| 2011/0302102 A1* | 12/2011 | Yeleshwarapu | G06Q 10/10 705/347 |
| 2012/0232953 A1* | 9/2012 | Custer | G06Q 10/00 705/7.32 |
| 2012/0245923 A1* | 9/2012 | Brun | G06F 17/2735 704/9 |
| 2012/0245924 A1* | 9/2012 | Brun | G06F 17/2745 704/9 |
| 2012/0260209 A1* | 10/2012 | Stibel | G06Q 40/02 715/780 |
| 2013/0085804 A1* | 4/2013 | Leff | G06O 30/0219 705/7.29 |
| 2013/0166457 A1* | 6/2013 | Du | G06Q 30/01 705/304 |
| 2013/0173612 A1* | 7/2013 | Shah | G06Q 50/01 707/731 |
| 2013/0185222 A1 | 7/2013 | Pulito | |
| 2013/0191304 A1* | 7/2013 | Gaucas | G06Q 30/02 705/347 |
| 2013/0275884 A1* | 10/2013 | Katragadda | H04L 65/403 715/753 |
| 2013/0304900 A1* | 11/2013 | Trabelsi | H04L 67/1057 709/224 |
| 2013/0311968 A1* | 11/2013 | Sharma | G06Q 10/06 717/101 |
| 2013/0346160 A1* | 12/2013 | Dunst | G06Q 30/0217 705/7.36 |
| 2014/0040161 A1* | 2/2014 | Berlin | G06Q 30/0282 705/347 |
| 2014/0044250 A1* | 2/2014 | Gartner | H04M 3/00 379/265.09 |
| 2014/0136443 A1* | 5/2014 | Kinsey, II | G06Q 10/06311 705/347 |
| 2014/0188665 A1 | 7/2014 | Baker | |
| 2015/0032675 A1* | 1/2015 | Huehn | G06Q 50/01 706/12 |
| 2015/0066803 A1 | 3/2015 | Aneja | |
| 2016/0055555 A1* | 2/2016 | Mills | G06Q 30/0609 705/26.35 |
| 2016/0086196 A1* | 3/2016 | Clark | G06F 17/30598 705/7.29 |
| 2016/0180414 A1* | 6/2016 | Willard | G06Q 30/0282 705/347 |
| 2016/0189173 A1* | 6/2016 | King | G06Q 30/0201 705/7.29 |
| 2016/0217488 A1* | 7/2016 | Ward | G06Q 30/0245 |
| 2016/0352805 A1* | 12/2016 | Seida | H04L 67/025 |
| 2017/0004205 A1* | 1/2017 | Jain | G06F 17/30011 |
| 2017/0085657 A1 | 3/2017 | Bostick et al. | |
| 2017/0243303 A1* | 8/2017 | Doddmani Manjunath | G06Q 50/01 |
| 2018/0024832 A1* | 1/2018 | Dang | G06F 8/74 717/104 |

OTHER PUBLICATIONS

Yi Z, Sha Y, Narayan V, Ying Z. Modeling Consumer Learning from Online Product Reviews. Marketing Science [serial online]. Jan. 2013;32(1):153-169. Available from: Business Source Complete, Ipswich, MA.*

Feng W, Li C. Review mining for estimating users' ratings and weights for product aspects. Web Intelligence (2405-6456) [serial online]. Sep. 2015;:137-152. Available from: Computers & Applied Sciences Complete, Ipswich, MA.*

Cui, L. et al.; "Mining E-Commerce Feedback Comments for Dimension Rating Profiles"; Advanced Data Mining and Applications. 9th International Conference; ADMA 2013. Proceedings: LNCS 8346, pp. 1-12; 2013.

Chen, L. et al.; "Preference-based clustering reviews for augmenting e-commerce recommendation"; Knowledge-Based Systems, vol. 50, pp. 44-59, Sep. 2013.

IBM; "Unified Review Framework"; An IP.com Prior Art Database Technical Disclosure; http://ip.com/IPCOM/000181583; Apr. 6, 2009.

Anonymously; "Unsupervised detection of representative reviewers from product reviews"; An IP.com Prior Art Database Technical Disclosure; http://ip.com/IPCOM/000232660; Nov. 25, 2013.

Kent, K., TripAdvisor to Let Renovated Hotels Delete Old, Outdated Reviews; www.reviewtrackers.com; Sep. 10, 2013; http://www.reviewtrackers.com/tripadvisor-renovated-hotels-delete-old-outdated-reviews/.

Schaal; D.; Expedia Collaborates with Hotels to Counter Negative Guest Reviews; www.skift.com; Jan. 13, 2015; http://skift.com/2015/01/13/expedia-collaborates-with-hotels-to-counter-negative-guest-reviews/.

Takahashi, D.; IBM Researcher Can Decipher Your Personality from Looking at 200 of your Tweets; Oct. 8, 2013; http://venturebeat.com/2013/10/08/ibm-researcher-can-decipher-your-personality-in-200-tweets/.

Takahashi, D.; How IBM's Michelle Zhou Figured out my Personality from 200 Tweets (interview); Oct. 11, 2013; http://venturebeat.

(56) References Cited

OTHER PUBLICATIONS com/2013/10/11/how-ibms-michelle-zhou-figured-out-my-personality-from-200-tweets-interview/.

* cited by examiner

AUTOMATED UPDATING OF ON-LINE PRODUCT AND SERVICE REVIEWS

BACKGROUND

The present invention relates generally to on-line product and service review analysis, and more particularly to automatically updating on-line product and service reviews based upon textual analysis and post-review changes to the reviewed products and services.

Products and services rely heavily upon on-line reviews provided by their customers and users. Over time, however, product and service reviews become stale, outdated, and potentially inaccurate representations of the current state of the product or service to which the review applies. For example, hotels rely quite heavily upon their customers' on-line reviews. A negative review can adversely impact the hotels business for a long period of time. If, however, the poor review was attributable to a feature that has been updated/fixed (e.g., old decor in the rooms where the rooms were all remodeled after the posting of the review), the poor review is unfairly impacting the business of the hotel. Likewise for product reviews, when a poor review of a product is based upon a feature that has been updated or fixed by the manufacturer, the perpetual existence of that negative review, despite its up to the date lack of relevance and accuracy, remains and adversely impacts sales of that product.

It would be useful to provide a system that analyzes on-line reviews of products and services and, based upon the text of the review, provides corrective information and/or diminished weight to the outdated review.

It would also be useful to provide a system that updates on-line product and service reviews based upon a reviewer's personal biases.

It would further be useful to provide a system that updates on-line product and service reviews based upon a reviewer's personal preferences.

SUMMARY

In accordance with the foregoing objects and advantages, the present invention provides a computerized system that analyzes the text of on-line product and service reviews, compares the textual components of the review with a database of manufacturer/service producer updates to the product or service to which the review pertains, provides corrective commentary to the review based upon post-review action taken by the manufacture/service provider, and adjusts the weighting of the review on the basis of the outdated information.

In one aspect of the invention, a system is provided for updating on-line product/service reviews for a given product/service, comprising: a server computer; a web server on which the on-line product/service reviews and the dates on which the on-line product/service reviews were entered are stored in non-transitory memory; a database on which is stored data representative of: products/services subject to on-line review, and updated and fixed features of the products/services subject to review and the dates from which the updated and fixed features are effective, wherein the data representative of updated and fixed features is automatically updated within the database on a predetermined periodic basis; software stored in non-transitory memory on the server computer, the software comprising program executable code for performing: natural language processing, including classification, lemmatization and sentiment break-down for each of the on-line product/service reviews to generate analyzed on-line product/service reviews; comparison of the data representative of said updated and fixed features with the analyzed on-line product/service reviews; comparison of the data representative of the effective date from which the updated and fixed features are effective with the dates on which the on-line product/service reviews were entered; and inserting text in the on-line product/service review representative of the updated and fixed feature and the date from which said updated and fixed feature is effective to generate an altered on-line product/service review if the data representative of the updated and fixed features matches said analyzed on-line product/service reviews In another aspect of the invention, a method is provided for updating on-line product/service reviews for a given product/service, comprising the steps of: analyzing the on-line product/service reviews by: performing natural language processing techniques to classify the on-line product/service reviews; performing natural language processing techniques to lemmatize the on-line product/service reviews; and separating sentiment from the on-line product/service reviews; comparing the analyzed product/service reviews to data stored on a database representative of updated and fixed features of the products/services subject to review and the dates from which the updated and fixed features are effective; and inserting text into any product/service review which contained negative sentiment regarding a product/service feature that was subsequently updated or fixed that indicates the product/service feature has been updated and fixed.

In another aspect of the invention, a software product stored in non-transitory memory of a computer is provided for updating on-line product/service reviews for a given product/service and that communicates with a database on which is stored data representative of products/services subject to on-line review, and updated and fixed features of the products/services subject to review and the dates from which the updated and fixed features are effective, wherein the data representative of updated and fixed features is automatically updated within the database on a predetermined periodic basis, the software product comprising executable program code for performing: natural language processing, including classification, lemmatization and sentiment break-down for each of the on-line product/service reviews to generate analyzed on-line product/service reviews; comparison of the data representative of the updated and fixed features with the analyzed on-line product/service reviews; comparison of the data representative of the effective date from which the updated and fixed features are effective with the dates on which the on-line product/service reviews were entered; and inserting text in the on-line product/service review representative of the updated and fixed feature and the date from which said updated and fixed feature is effective to generate an altered on-line product/service review if the data representative of the updated and fixed features matches the analyzed on-line product/service reviews.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
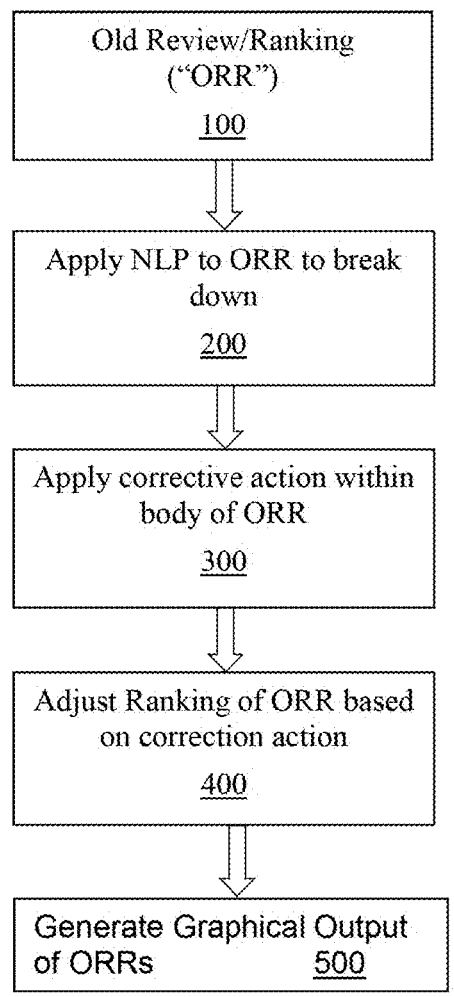
FIG. 1 is a high level block diagram in accordance with an aspect of the present invention.

Referring now to the drawings the present invention provides a system 10 for analyzing using, for example, natural language processing (NLP) classification techniques, and, when appropriate, annotating and/or altering on-line product and/or service reviews and rankings ("ORR") for purposes of making the ORR reflective and accurate of the current state of the product or service to which it applies. Ultimately, once analysis is completed and assessed, the system software will aggregate all of the review feedback from all reviewers based on the NLP classification techniques and present the aggregated data on a visual graph, such as, for example, a color coded graph with commentary and indications as to when product/service issues have been or will be addressed/fixed. Such aggregation will continue in real time on an on-going basis.

System 10 comprises a server computer 12 which may, for example, be that of a company that operates an on-line website that offers a particular product(s) and/or service(s) for which users are invited and able to submit on-line reviews, a web server computer 14 (which may be the same as server computer 12 or a different computer) that serves the web page associated with the company's product(s)/service(s) and contains the ORR's, a database 16 stored in the non-transitory memory of a computer (it could be computer 12/14 or a different computer) and on which is stored a repository of data representative of the: (1) product(s)/service(s) subject to on-line review, (2) updated and fixed features of the product(s)/service(s) subject to review and the dates from which the updated and fixed features are effective, (3) reviewer data indicative of a reviewer's product/service biases (which is updated by the software as it continues to learn more about each reviewer's biases), and (4) user data indicative of a user's product/service preferences (e.g., what each user considers important or unimportant about a product/service) (and which also continues to be updated as the software continues to learn more about each user's product/service preferences), wherein the data representative of updated and fixed features is automatically updated within the database on a predetermined periodic basis, and software that is stored in the non-transitory memory of computer server 12 (or another computer that could be integrated into system 10). Collectively, the software communicates with the database 16 and web server 14 to cause computer 12/14 to read and analyze the ORRs 100 using NLP techniques in step 200, and then edit or augment each ORR that contains outdated information through insertion of corrective text in the ORR (or in association therewith (e.g., a "bubble text" or other expressive feature that a reader of the ORR could see in connection with the ORR)) in step 300. In addition, in step 400 the software can edit any ranking of the product/service if its associated ORR was premised upon a feature that has since been corrected and/or was based on a reviewer's bias or other reviewer trait. Finally, the software can generate graphical output in step 500 that provides the user with a visual timeline of ORR's and product/service updates.

Figure 2:
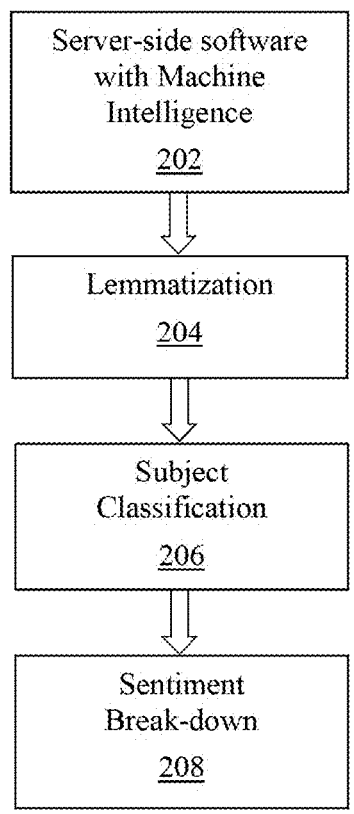
FIG. 2 is a high level block diagram of software used in accordance with an aspect of the present invention.

More specifically, the software contains a cognitive system 200, as shown in FIG. 2, that communicates with the repository of product/service information contained in database 16. The cognitive system 200 is enabled through use of NLP techniques of machine intelligence 202 that facilitate concise understanding of the text of any ORR. The NLP techniques include server side software with machine intelligence 202 that facilitate reading and understanding a body of text and determine the sentiment about specific aspects of any reviewed product/service. Lemmatization 204 breaks down the text of an ORR to the Lemma level (e.g., "walking," "walks," "walked" all have a lemma of "walk."). Next, subject classification techniques 206 are applied; a variety of models that are understood to one of ordinary skill in the art can be used to achieve classification (e.g., "Maximum Entropy" (also known as "max-ent") or "Deep Learning/"Neural Net" models are two such examples). Once the text from any ORR is broken down by part and simplified according to these techniques, sentiment break-down 208 from the ORR can be done. For example, if the subject of the text in an ORR is the heart rate monitor feature and the reviewer's sentiment is low because of product inaccuracy, and the ORR was written, for example, more than one year ago, the software will compare features of the heart rate monitor stored on the database 16 to determine if the accuracy was improved through changes made since the time the ORR was made (e.g., determine whether the database 16 contains data representing that the heart rate monitor was made more accurate in all conditions in the, e.g., Model 2.11 Release from 4 months ago).

As briefly described above, database 16 contains a repository of product/service information. For a large on-line retail site, database 16 would contain in memory a repository of information about products sold on the site (or at least some subset thereof). The repository would contain concise information about product updates/fixes and when any issues or features with the products were added, and product manufacturers whose products are included on the database 16 could have their computers 18 that contain product/service data stored thereon access thereto to update such information in real time. The standard repository of database 16 could be updated on a periodic basis, such as once per day.

Figure 3:
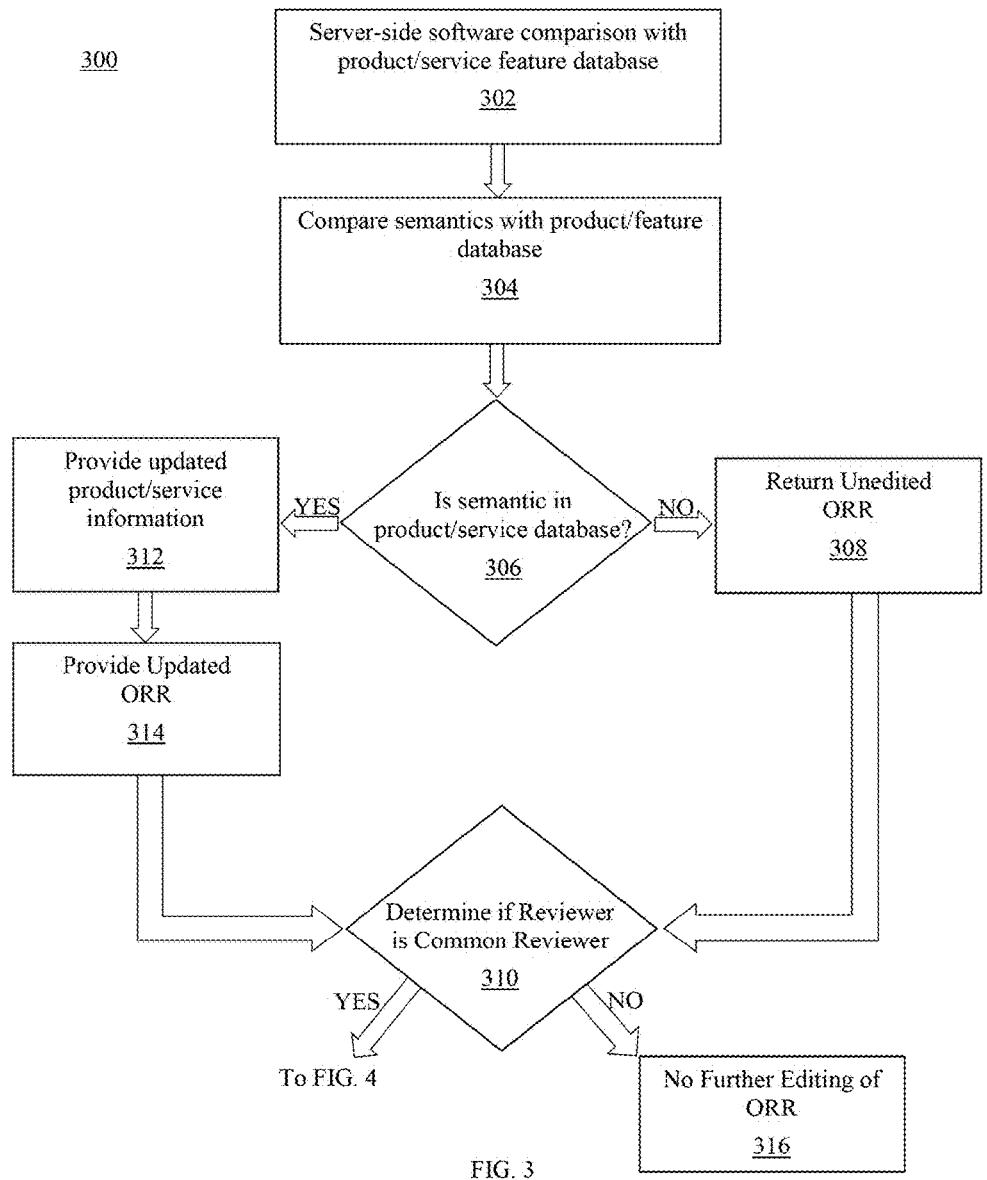
FIG. 3 is a first partial flow chart in accordance with an aspect of the present invention.
Figure 4:
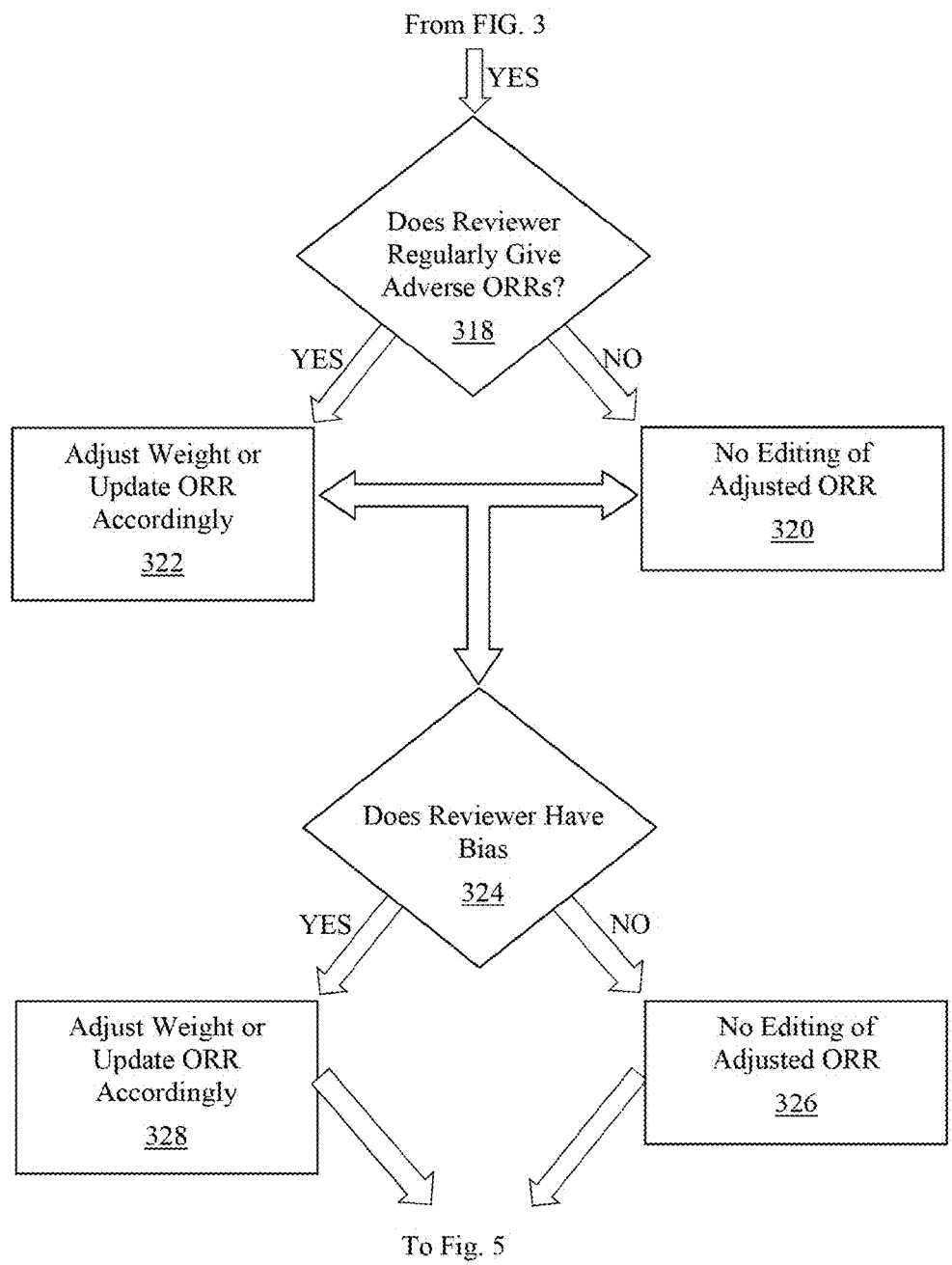
FIG. 4 is a second partial flow chart in accordance with an aspect of the present invention.
Figure 5:
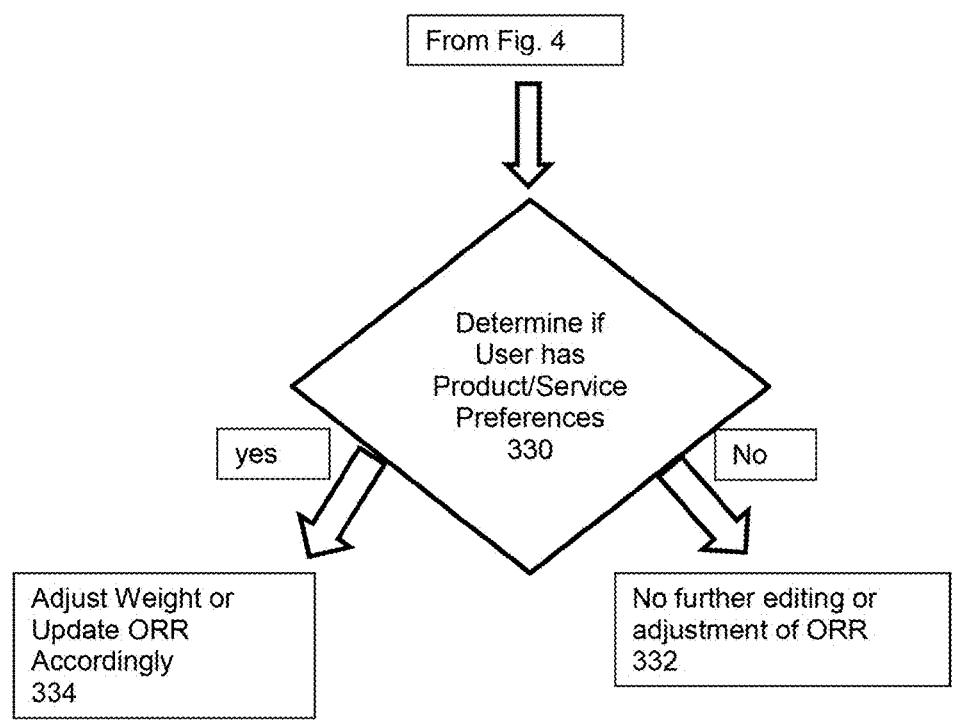
FIG. 5 is a third partial flow chart in accordance with an aspect of the invention.
Figure 6:
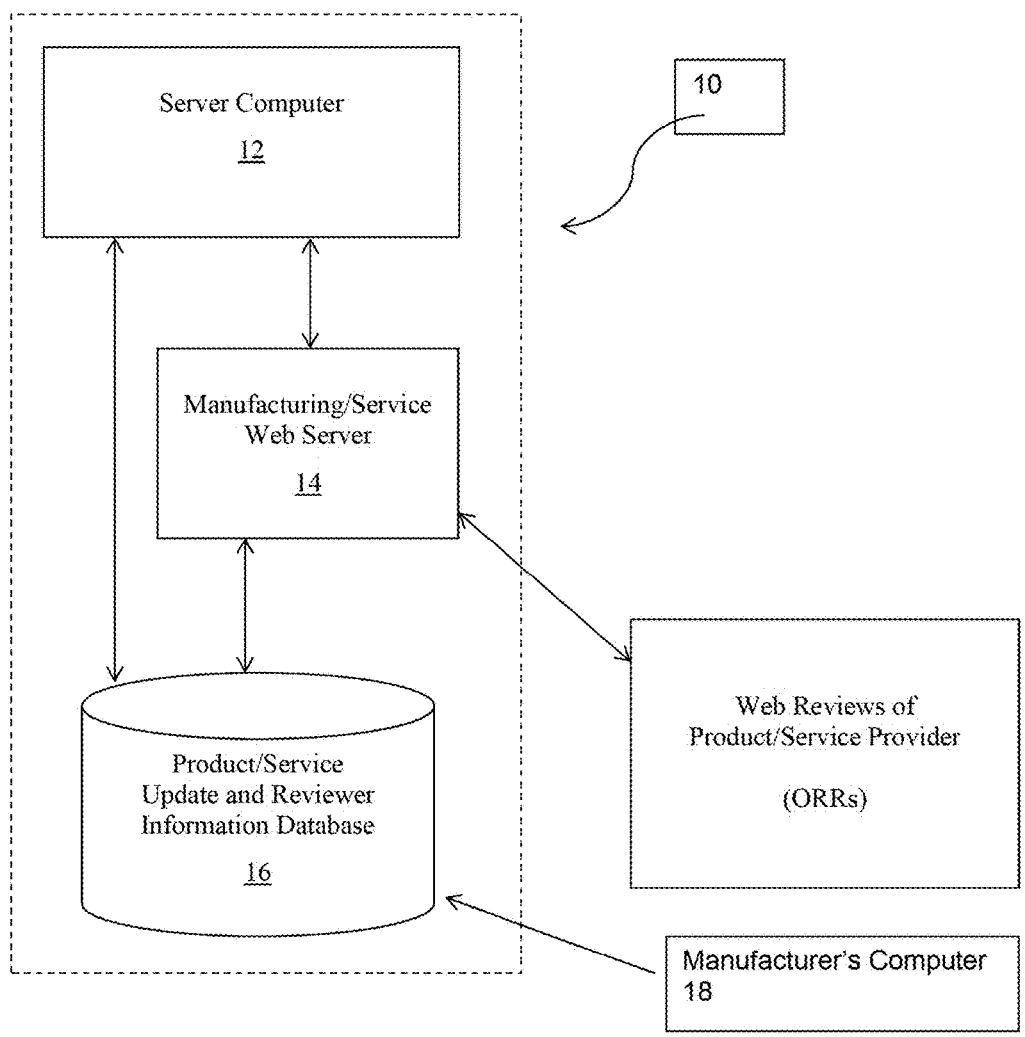
FIG. 6 is a block diagram schematically illustrating a system in accordance with an aspect of the present invention.

With reference to FIGS. 3-5, the server side software will first execute its NLP techniques on an ORR in step 302, and then compare the semantic break-down with the product/serve features included in the database 16 in step 304 and will determine whether the semantic break-down matches any of the updated/fixed product/service features included in database 16 in step 306. If the semantic break down is determined by the software not to have any matches in the database 16 in regard to product/service updates/fixes, then it will return an unedited ORR in step 308 and continue its process of determining whether the reviewer is one for whom the database 16 has any data in step 310. If there is a match between semantic break-down and the product/service fixes/updates in database 16, the software will retrieve the updated product/service information from database 16 in step 312 and provide an updated ORR in step 314 with the updated information before carrying forward to determining whether the reviewer is one for whom data has been stored in database 16 in step 310. If the reviewer is not one for whom database 16 has data, no further editing of the ORR will occur at this time per step 316. If the reviewer is one for whom data is contained within database 16, the software can then execute code that will communicate with database 16 for purposes of determining whether the reviewer in one who regularly gives adverse reviews in step 318. If it is determined that the reviewer is not one whom regularly gives adverse reviews, no further editing of the ORR is necessary, in step 320. If, however, it is determined that the reviewer is one who regularly gives adverse reviews, the weight of the ORR can be adjusted accordingly, in step 322. Next, the software will execute code that will communicate with database 16 for purposes of determining whether the reviewer has a particular bias, in step 324. If no bias is found to exist, then no further editing of the ORR is necessary at this stage per step 326. If a bias is found to exist, then in step 328 the weight of the ORR can be adjusted accordingly. Finally, in step 330 the software can execute code to communicate with database 16 to determine whether there is any data for the user that reveals preferences of that user. If no preferences are found to exist, no further editing of the ORR is necessary, as in step 332. If the user is one who has preferences that data for which is stored in database 16, the ORR can be adjusted to reflect this particular user's preferences more accurately, in step 334.

With regard to adjusting the weight based on the sentiment of a particular reviewer and/or the bias of a particular reviewer in steps 318 and 324, the server side software will process linear algebraic equations that perform operations on vectors set up for the reviewer sentiment (e.g., S (x, y) for a 2-dimensional sentiment vector representing, for example, positive and negative sentiments across its dimensions and the bias (e.g., B (x, y)) for a 2-dimensional bias vector. The algebraic relationships and degree of effect on weighting are a purely matter of design choice for the particular implementation of the embodiment of the present invention.

More summarily, in implementing the present invention, one aspect is for the software to take corrective action within an ORR. For example, if an ORR says "I can't stand the way the right mouse click delay's two seconds" a tag of desired format (e.g., bubble with text in a preferred embodiment) can be inserted into the ORR by instructions provided by the software to indicate "The delay was due to a firmware issue which was fixed in all products sold after August 16, 2012." This corrective action is achieved in step 302 through the software using the machine intelligence program code to read the text, understand what it is saying, and see/compare if there is information on this feature in the database 16 starting at step 304, 306, et seq., as described above. This analysis/assessment of the ORR can be done in real time as a user brings up a web page with the specific ORR. At that time, the software on the web server 14 will be executed to read the ORR, break down the ORR and classify it per subject and sentiment. Any negative comments in the ORR can then automatically be compared to the repository of data in database 16. The time period in which analysis can be performed may also be represented by a vector T (x, y) that can be factored into the linear algebraic equation that is used for a particular implementation.

Next, based on features that have been updated/corrected, if a ranking was also a part of the ORR, it is assessed and, if appropriate, amended based upon the updated/fixed feature in step. While the software cannot "guess" at what a reviewer might have rated any aspect if the problem cited did not exist, it can devalue the particular aspect of the ranking As an example, if a reviewer ranked three aspects of a product as follows: hear rate monitor (1 out of 5)—associated to the 1 out of 5 ranking is a comment that the heart rate monitor freezes on the screen and ceases to work (i.e., in the ORR the reviewer has made that comment). After breaking down the ORR and comparing to database 16, bubble text has been inserted that states "The review is from June 2012. Meanwhile, release 3.1 fixed this issue in February 2014 and the heart rate function is reviewed positively since that time."; GPS accuracy (4 out of 5); and look and feel of the watch (5 out of 5). Now, based on the fact that the issue appears to have been fixed subsequent to the user's ORR, the heart rate monitor rating would be devalued and not count towards the average ratings being determined, and the overall score may be slightly affected as well.

The numeric rating could be adjusted by other factors known in the art. For example, the present system could be combined with personal preference algorithms such that the ratings for certain features could be weighted more highly than other features based on what the system has come to know about the user. Multiple scores may be provided in a given user interface. For instance, the average rating as known today; configurable, the average rating as per important features to any user based on devaluing the weight of non-important features; configurable by calculating in an understanding of the reviewer and identifying biases of the reviewer against any product (i.e., the user always gives low scores to Apple products no matter what the product is, the weight of any score may be adjusted and devalued).

To determine bias, data representative of bias based on the semantic breakdown of text by the software is gathered. This data may be based on historical records of a user's on-line comments and/or gathered in a real-time stream if needed. Regardless, this aspect of the invention relies in part on the bias data collection, and the timing of the collection is not directly material to the processing of the data done by the software. In addition, it is worth noting that it is the data that is collected, how it is collected, and how that data is then organized into vectors that is important for the analytical processing performed by an embodiment of the software of the present invention; once the data is in its preferred format, it is computationally enabled for the analytical processing associated with an aspect of the present invention.

With regard to an aspect of the present invention wherein a user gives a high numerical ranking in an ORR, but provides negative sentiment in comments within the ORR, an embodiment of the present invention can address this conflicting ORR (i.e., an ORR having both positive attributes and negative attributes). For example, on an on-line retail website, a user may give a movie 1/5 stars. The user loved the movie, but hated the DVD transfer. In such an instance, the cognitive system 200 would break this out into multiple ratings by a user for specific things. So, if a user Bob says: 1/5 stars "I loved this movie, but the DVD transfer was terrible . . . the extras were OK," the cognitive system would break this up as: Bob, loved this movie, positive sentiment 5/5 stars; Bob, DVD transfer terrible, negative sentiment, 1/5 stars; Bob, extras were ok, neutral sentiment 3/5 stars. The software would start its analytical processing with the initial basis (in this case 1/5) and forward-engineer into the other sentiment categories that may have been extracted. In this case, it would likely be 3/5 for the neutral and 5/5 for the positive. If the user had given the same review a 3/5 instead of 1/5, then the negative sentiment would have been scored 3/5, neutral 4/5, positive 5/5. In this manner, the software will extrapolate multiple reviews from a single review.

Figure 7:
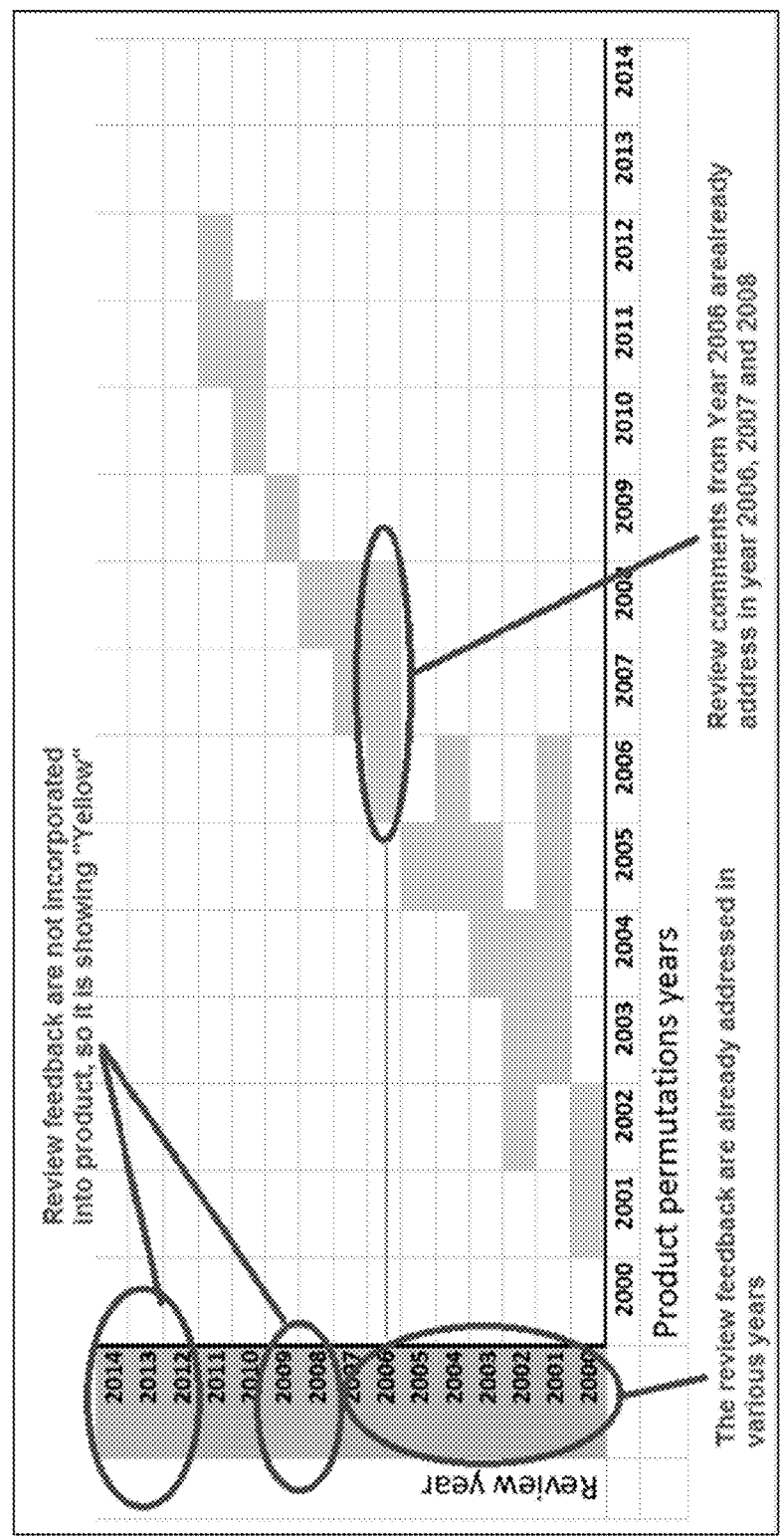
FIG. 7 is a first illustrative graphical output generated in accordance with an aspect of the present invention.
Figure 8:
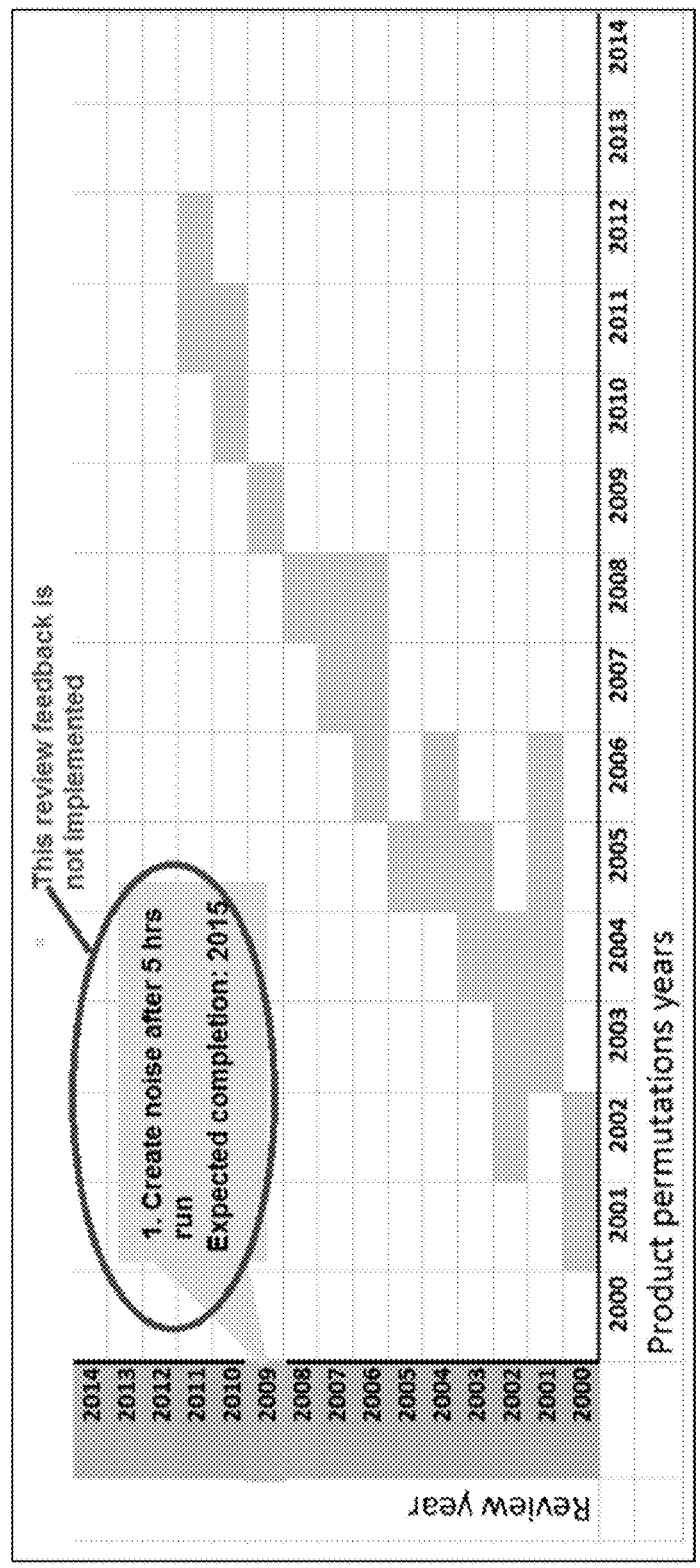
FIG. 8 is a second illustrative graphical output generated in accordance with an aspect of the present invention.

Finally, a visual summary representation as seen in FIGS. 7 and 8 is provided. The software will aggregate the review feedback from all users based on the NLP classification techniques described above. The prevalent commentary for any time period will be aggregated and shown on the graph in any preferred format (e.g., as bubble commentary in a preferred embodiment). An indication will be provided for when any such issue is fixed or will be fixed by pulling that data directly from database 16. In one embodiment, the chart would be color coordinated to permit easy visual discernment of the information expressed thereby. Of course, other visual display formats could be used (e.g., box plots, bubble charts, calendar views, Voronoi diagrams, population pyramid diagrams, tree maps, etc.). More specifically, FIG. 7 provides a timeline of product permutations, while FIG. 8 adds to this more detailed information taken from an individual cell within the graph. The graphical representations permit the user to have an immediate understanding of what product features are already implemented, which are pending, which have not been addressed, and the like, and users will have an understanding of any issues not yet implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for updating on-line product/service reviews for a given product/service, comprising:
   i. a server computer;
   ii. a web server on which the on-line product/service reviews and corresponding dates on which the on-line product/service reviews were entered are stored in non-transitory memory;
   iii. a database on which is stored data representative of:
      1. products/services subject to on-line review, and
      2. updated and fixed features of said products/services subject to review and corresponding dates from which said updated and fixed features are effective, wherein said data representative of updated and fixed features is automatically updated within said database on a predetermined periodic basis;
   iv. software stored in non-transitory memory on said server computer, said software comprising program executable code for performing:
      1. natural language processing, including classification, lemmatization and sentiment break-down for each of the on-line product/service reviews to generate analyzed on-line product/service reviews;
      2. comparison of said data representative of said updated and fixed features with said analyzed on-line product/service reviews;
      3. comparison of said data representative of the effective date from which said updated and fixed features are effective with said dates on which the on-line product/service reviews were entered;
      4. generating, automatically, text representative of the updated and fixed feature and a date from which said updated and fixed feature is effective if said data representative of said updated and fixed features matches said analyzed on-line product/service reviews; and
      5. inserting the text in said on-line product/service review to automatically generate an altered on-line product/service review.

2. The system according to claim 1, wherein said software further comprises program code for generating a visually observable timeline for each product/service that has been subject to review that contains data representative of the product/service features reviewed and any associated updates or fixes associated with said reviewed product/service features.

3. The system according to claim 2, wherein said software contains program code for aggregating the data associated with at least a portion of the on-line reviews of a product/service for purposes of generating said visually observable timeline.

4. The system according to claim 1, wherein said software further comprises code for adjusting rankings of the products/services subject to review based upon said updated and fixed features of said products/services that occurred after a review that commented negatively about said updated and fixed features of said products/services.

5. The system according to claim 4, wherein said database further stores data representative of individual reviewers' biases.

6. The system according to claim 5, wherein said software communicates with said database and further comprises program code for determining reviewer bias.

7. The system according to claim 6, wherein said software further comprises program code for adjusting rankings of the products/services subject to review based upon said reviewer bias.

8. The system according to claim 1, wherein said database further stores data representative of individual reviewer's product/service preferences.

9. The system according to claim 8, wherein said software communicates with said database and further comprises program code for customizing said product/service review based on said individual reviewer's products/services preferences.

10. A method for updating on-line product/service reviews for a given product/service, comprising the steps of:
    a) analyzing the on-line product/service reviews by:
       i. performing natural language processing techniques to classify the on-line product/service reviews;
       ii. performing natural language processing techniques to lemmatize the on-line product/service reviews; and
       iii. separating sentiment from the on-line product/service reviews;
    b) comparing the analyzed product/service reviews to data stored on a database representative of updated and fixed features of said products/services subject to review and the dates from which said updated and fixed features are effective;
    c) generating, automatically, text regarding a product/service feature that was subsequently updated or fixed that indicates the product/service feature has been updated or fixed; and
    d) inserting, automatically, the text into any product/service review which contained negative sentiment.

11. The method according to claim 10, further comprising the step of generating a visually observable timeline for each product/service that has been subject to review that contains data representative of the product/service features reviewed and any associated updates or fixes associated with said reviewed product/service features.

12. The method according to claim 11, further comprising the step of aggregating the data associated with at least a portion of the on-line reviews of a product/service for purposes of generating said visually observable timeline.

13. The method according to claim 10, comprising the further step of for adjusting rankings of the products/services subject to review based upon said updated and fixed features of said products/services that occurred after a review that commented negatively about said updated and fixed features of said products/services.

14. The method according to claim 13, comprising the further step of storing in a database data representative of individual reviewers' biases.

15. The method according to claim 14, comprising the further step of communicating with the database, determining reviewer bias, and adjusting rankings of the products/services subject to review based upon said reviewer bias.

16. A software product stored in non-transitory memory of a computer for updating on-line product/service reviews for a given product/service and that communicates with a database on which is stored data representative of products/services subject to on-line review, and updated and fixed features of the products/services subject to review and the dates from which the updated and fixed features are effective, wherein the data representative of updated and fixed features is automatically updated within the database on a predetermined periodic basis, the software product comprising executable program code for performing:
 a) natural language processing, including classification, lemmatization and sentiment break-down for each of the on-line product/service reviews to generate analyzed on-line product/service reviews;
 b) comparison of said data representative of said updated and fixed features with said analyzed on-line product/service reviews;
 c) comparison of said data representative of the effective date from which said updated and fixed features are effective with said dates on which the on-line product/service reviews were entered;
 d) generating, automatically, text representative of the updated and fixed feature and the date from which said updated and fixed feature is effective if said data representative of said updated and fixed features matches said analyzed on-line product/service reviews; and
 e) inserting, automatically, the text in said on-line product/service review to generate an altered on-line product/service review.

17. The system according to claim 16, further comprising program code for generating a visually observable timeline for each product/service that has been subject to review that contains data representative of the product/service features reviewed and any associated updates or fixes associated with said reviewed product/service features.

18. The system according claim 17, further comprising program code for aggregating the data associated with at least a portion of the on-line reviews of a product/service for purposes of generating said visually observable timeline.

19. The system according to claim 16, further comprising program code for adjusting rankings of the products/services subject to review based upon said updated and fixed features of said products/services that occurred after a review that commented negatively about said updated and fixed features of said products/services.

20. The system according to claim 19, wherein said database further stores data representative of individual reviewers' biases, said software communicates with said database and further comprises program code for determining reviewer bias, wherein said software communicates with said database and further comprises program code for determining reviewer bias, and said software further comprises program code for adjusting rankings of the products/services subject to review based upon said reviewer bias.

* * * * *